United States Patent [19]

Van Etten

[11] 3,906,252

[45] Sept. 16, 1975

[54] SHORT PULSE RF GENERATOR

[75] Inventor: Paul Van Etten, Clinton, N.Y.

[73] Assignee: The United States of America as represented by the Secretary of the Air Force, Washington, D.C.

[22] Filed: June 19, 1974

[21] Appl. No.: 480,770

[52] U.S. Cl. .................. 307/106; 325/106; 331/127

[51] Int. Cl.² ............................................ H03K 3/00

[58] Field of Search ............. 325/27, 106, 107, 108; 331/127; 307/108, 106; 332/8

[56] References Cited

UNITED STATES PATENTS

| | | | |
|---|---|---|---|
| 3,011,051 | 11/1961 | Landecker | 325/106 |
| 3,505,533 | 4/1970 | Bernstein et al. | 307/108 |
| 3,644,747 | 2/1972 | Gray | 307/106 |

OTHER PUBLICATIONS

Anan'in et al., Generator of High Voltage Nanosecond Pulses With Precise Length, Instrum. and Exp. Tech., (USA) No. 4, (July–Aug. 1970) pp. 1115–1117.

*Primary Examiner*—George H. Libman
*Attorney, Agent, or Firm*—Joseph E. Rusz; George Fine

[57] ABSTRACT

An RF generator is provided for generating high-peak power short pulse RF waveforms with one or more RF cycles. Sections of transmission lines are automatically sequentially discharged through spark gaps to produce the radio frequency energy.

5 Claims, 6 Drawing Figures

SHORT PULSE RF GENERATOR

BACKGROUND OF THE INVENTION

In the prior art there exists apparatus for providing very short RF pulses. However, there are limitations which the present invention eliminates, such as moving parts, magnetic fields, vacuums, modulators, filament power supplies, and $x$-ray shielding. The present device only requires a high voltage power supply for an input where the PRF (pulse repetition frequency) and pulse RF output are obtained without external modulators or circuitry. An external trigger for triggering the PRF is available if required. In one embodiment, a two RF cycle waveform of 100 MHz was obtained with a 32 kilowatt peak-to-peak power output. Thus, this device produces high peak power RF pulses with short time durations which is uniquely practical for applications such as short or medium range high resolution radars for traffic control. It is also useful for airborne, tactical, and other systems requiring light weight at a low cost.

SUMMARY OF THE INVENTION

An RF generator produces high peak power RF pulses with short time duration. Sections of transmission line are sequentially discharged through spark gaps to provide the radio frequency energy. In one embodiment, a coaxial transmission line is utilized which contains alternate coupling capacitors and spark gaps in the center conductor. Adjustments are made to ensure the firing of the first spark gap and thereafter the remaining spark gaps are fired in sequence. The output signal from the RF generator is obtained across a load positioned at one end of the coaxial line. In another embodiment, the transmission line is a microstrip waveguide.

It is noted that the RF generator only requires a high voltage power supply for an input where the PRF and pulse RF output are obtained without external modulators or circuitry. An external signal for triggering the PRF is available if required.

Figure 1:
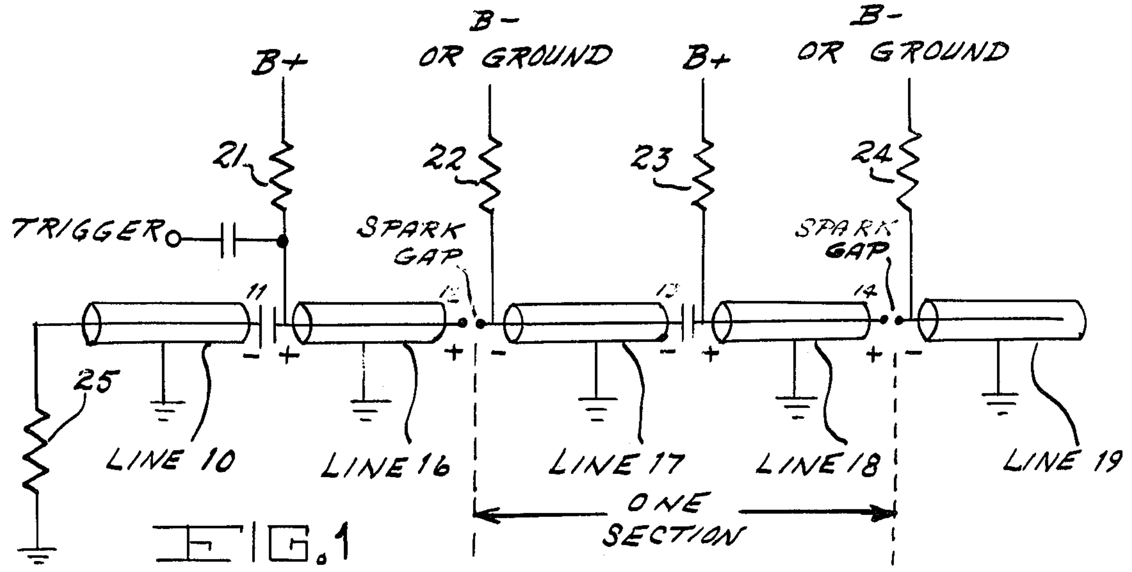
FIG. 1 illustrates in schematic diagram form one embodiment of the RF generator.

Now referring to FIG. 1 for an explanation of the operation of the RF generator, the apparatus contains line 10, coupling capacitor 11, line 16, spark gap 12, line 17, coupling capacitor 13, line 18, spark gap 14, and line 19. The line lengths (i.e., line 16, line 17, line 18 and line 19) are charged with alternate positive and negative voltages through charging resistors 21, 22, 23, and 24, respectively. As the lines charge, the voltage across the spark gaps increases. First spark gap 12 is adjusted with a smaller gap spacing such that it will fire first. The lines continue to charge until spark gap 12 fires (switches). When the switch is closed, two voltage step functions are launched, one to the left toward 50 ohm resistor load 25 and the other to the right. The one traveling to the load will be a negative step voltage when lines are charged as indicated in FIG. 1. If each coupling capacitor is considered to have a large value, the transmission line (of equal length to line 17 plus line 18) will discharge toward the load. The step function traveling toward the load is the leading edge of the pulse produced by the discharge of the segment of transmission line (of length equal to line 17 plus line 18). Because the spark gap can be designed to fire with a somewhat slow switch time, the pulse received by the load will not be a rectangular pulse but one with a finite rise time.

The other voltage step function traveling toward the right is a positive step. This positive step voltage waveform will pass through capacitor 13, a pulse coupling capacitor. The positive step waveform now arrives at spark gap 14 whereas its polarity is such as to overvoltage spark gap 14.

It should be noted that the employment of the coupling capacitors is an important feature of this invention. Without it, lines 17 and 18 would be charged with the same polarity and the step arriving at spark gap 14 would undervolt spark gap 14.

Upon overvolting spark gap 14, there are two conditions in which the device will operate. Condition No. 1 is when the value of the charging resistor is such that spark gap 14 is charged to the same voltage as spark gap 12 and any slight over-volting would immediately fire the gap. In this condition, line 19 is switched to the transmission line and the negative voltage waveform propagates toward the load in the same manner as the switching that occurred at spark gap 12. Any number of additional sections may be added to that shown in FIG. 1 (labeled "one section" in FIG. 1). For each section there will be produced one additional cycle of RF. Also note the number of RF cycles in the RF burst is equal to the number of spark gaps.

The second condition for overvolting spark gap 14 is when the value of resistor 24 is larger and spark gap 14 will be charged to a value less than spark gap 12. Since some time will be required to fire the gap, an open-ended transmission line appears to the positive step waveform and a positive pulse is reflected back toward the load until spark gap 14 fires.

Therefore, between each negative pulse going back toward the load as in condition No. 1 a positive pulse will be reflected toward the load. Under this condition the output frequency is determined by both the length of transmission line between the points and the formative time of the spark gap. Formative time is defined as the time difference between the time the step waveform reaches the gap and the time it takes the gap to fire.

In both conditions of operation, as described above, every other line segment is connected through a charging resistor to a negative power supply (marked B-). The device will operate in a similar manner if the B- lead is connected to ground. This has the advantage of the device requiring only one power supply. For very large peak power RF pulse operation (i.e., greater than a megawatt) it may be desirable to use both a negative and positive power supply for high voltage insulation problems when the device is constructed in a small volume. For example, in FIG. 3, the voltage between the center conductor and the wall of the coaxial waveguide will be one-half the value when using only one power supply to obtain the same power output.

The manner in which the device generates its PRF is now discussed. Assume that initially the power supply is turned on. Each line is then charged through a resistor. For example, line 16 of FIG. 1 is charged up until spark gap 12 fires. When all the gaps fire (which is a relatively short time) the lines again charge up and again fire. The charging resistor and the capacity of each line form a time constant for a relaxation oscillation. The relaxation time period, $\tau$ for typical gap spacings is $$\tau \approx RC$$

where R is the charging resistor and C the capacity of each line, whereas the PRF is the reciprocal of the relation time:

$$PRF = \frac{1}{\tau} \approx \frac{1}{RC}.$$

For a given carrier frequency the line lengths will be fixed. In turn the value of C will be fixed. For a required PRF the value of R is derived by $$R \approx \frac{1}{(PRF)C}.$$

As was discussed earlier, spark gap 12 must fire first. It is possible to insure that the first gap will fire first when all the gap spacings are the same. This is accomplished by using a smaller value of resistance for $R_{21}$ in FIG. 1. Under this condition the voltage across spark gap 12 will be higher than the others and it will therefore fire first. The PRF in this configuration is then:

$$PRF \approx \frac{1}{RC}$$

where R is resistor 21 and C is capacitor 11.

Figure 2:
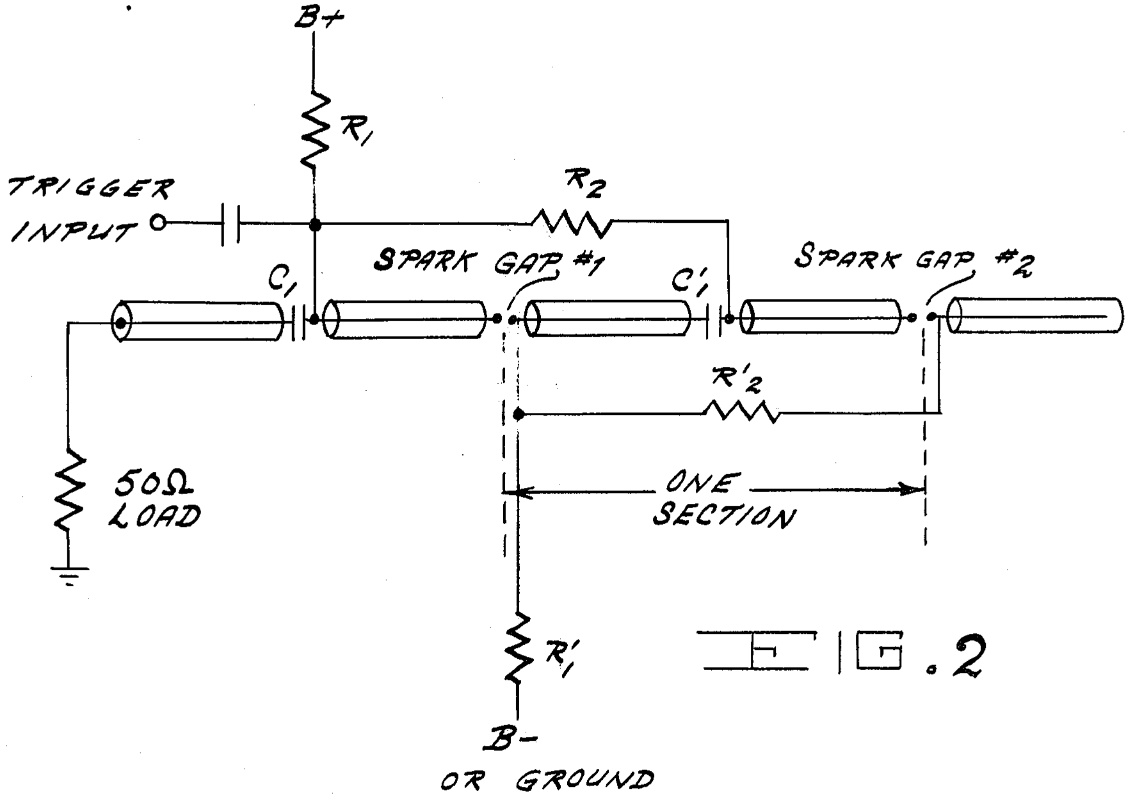
FIG. 2 represents a simplified illustration of FIG. 1 to indicate for ease of construction another configuration of the charging resistors where $R_1$, $R_2$, $R'_1$ and $R'_2$ are used in place of resistors 21, 23, 22, and 24, respectively, of FIG. 1.

To assure that spark gap 12 fires first, as explained above, and for ease of construction, the charging resistors may be configured as shown in FIG. 2. Generally resistors $R_1$ are much greater than $R_2$.

Figure 3:
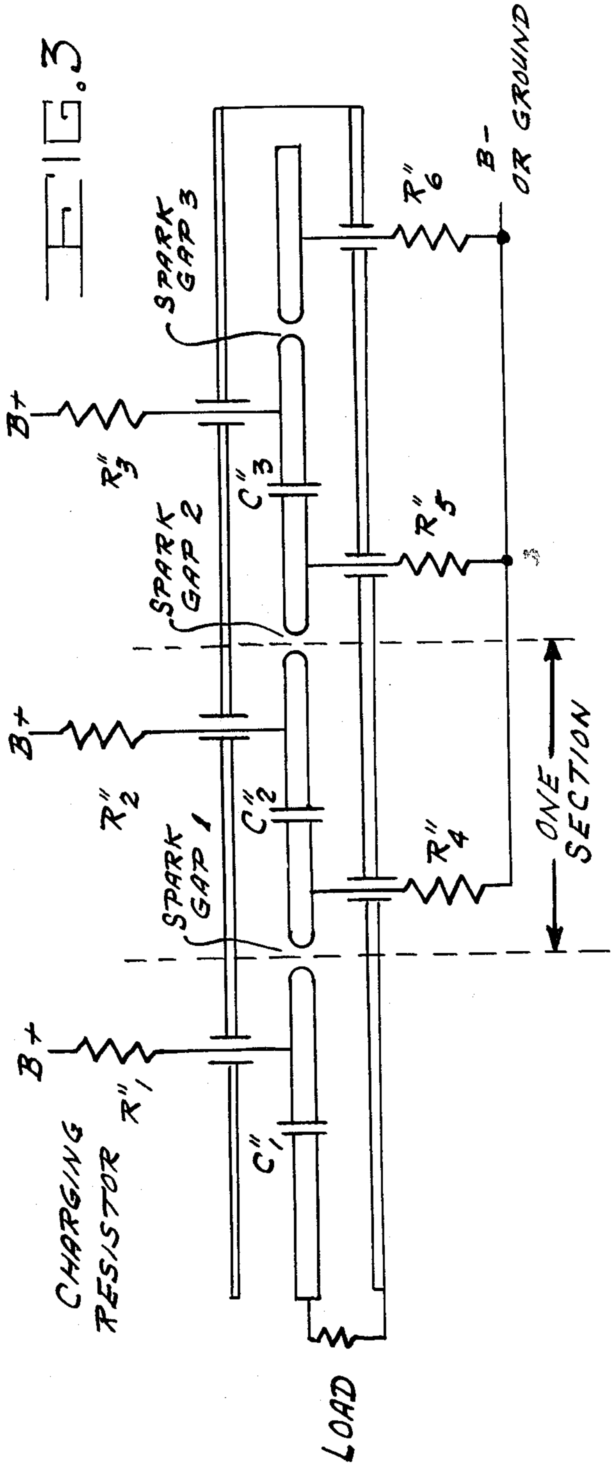
FIG. 3 shows one technique for constructing the RF generator of FIG. 1 in a 50 ohm coaxial transmission line configuration.
Figure 4:
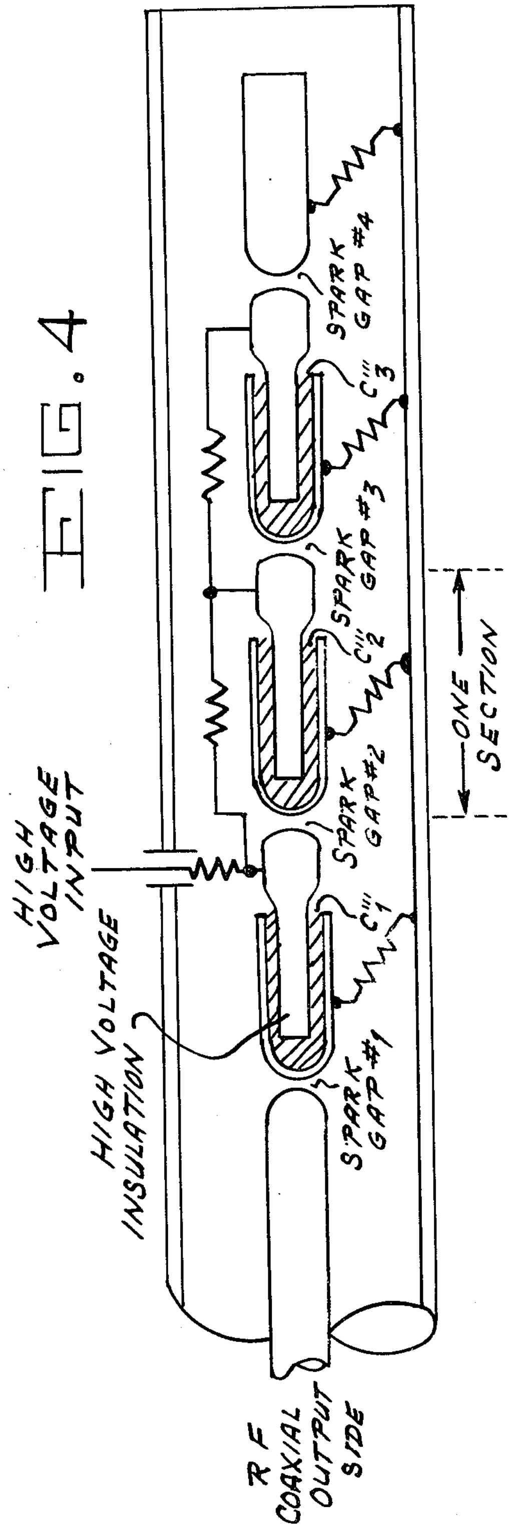
FIG. 4 shows a device similar to FIG. 3 but because of the required capacity and high voltage stand-off the capacitor is distributed as indicated.

FIG. 1 is a pictorial diagram for use in explaining the operation where FIG. 3 illustrates one technique for constructing the device in a 50 ohm coaxial transmission line configuration. The capacitors $C_1''$, $C_2''$, $C_3''$ shown are lumped constant. Their value of capacity should be large enough to pass the pulsed waveform down the 50 ohm transmission line. Because of both the required capacity and the high voltage standoff the capacitor may be distributed as shown as $C_1'''$, $C_2'''$, and $C_3'''$ in FIG. 4. Here the construction is such that the distributed capacity is obtained and a 50 ohm surge impedance is maintained within the transmission time. Other values of the surge impedance in transmission lines may be employed, 50 ohms is used as an example.

The device as thus far described generates its PRF with only a DC power supply. It is possible to trigger the device from an external trigger source. In this triggered mode of operation all the gaps are adjusted the same and are charged to near gap breakdown. An external trigger is coupled into the load side or at the junction of capacitor 11 and resistor 21 as seen in FIG. 1. The trigger pulse must have enough amplitude to overvolt the first gap as to fire it. The succeeding gaps will fire sequentially as in the self PRF mode of operation. A possible disadvantage of this triggering is the video triggering pulse will also appear in the load. If this is undesirable an RF bandpass filter can be placed just ahead of the load at the output.

Figure 5:
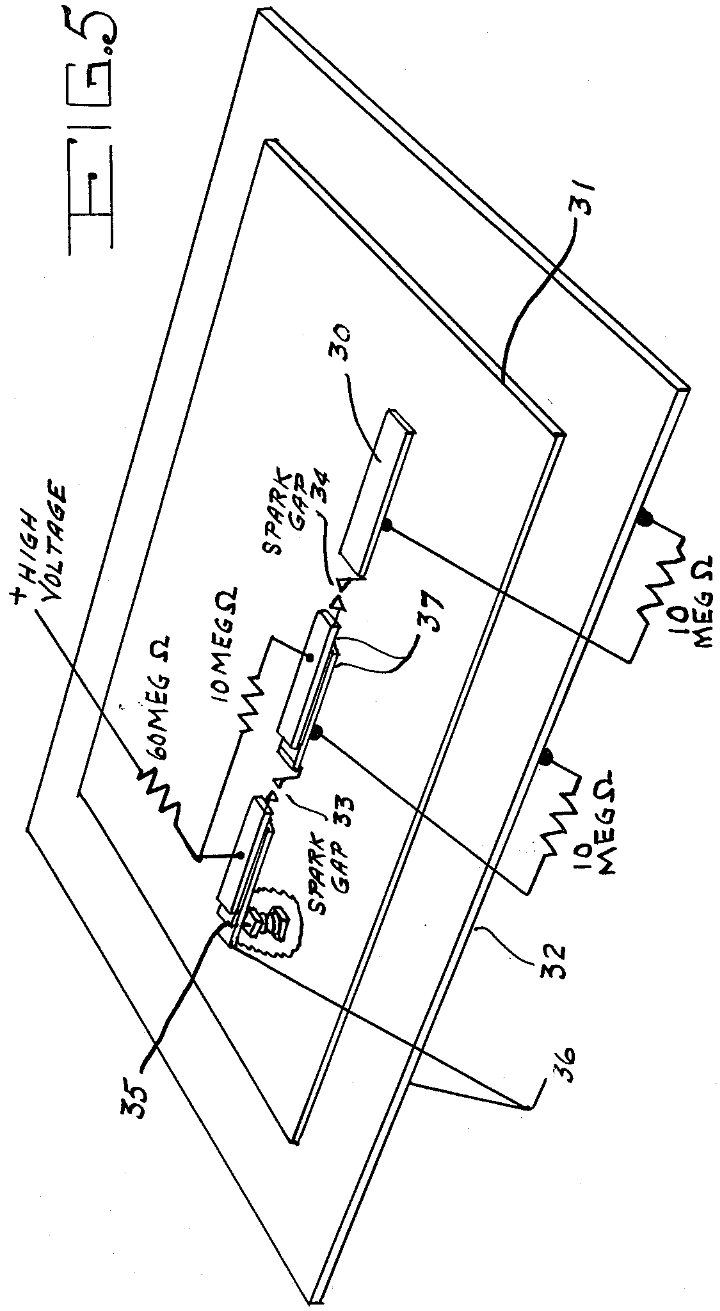
FIG. 5 shows an RF generator in a 50 ohm microstrip waveguide configuration.
Figure 6:
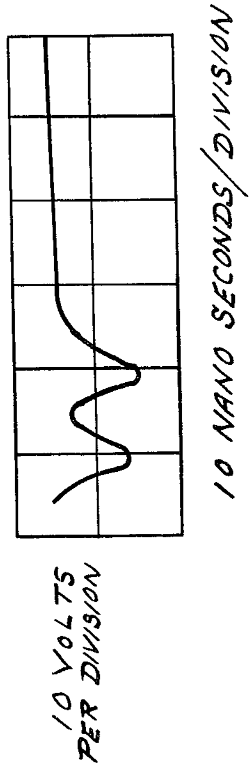
FIG. 6 shows the output waveform of the RF generator of FIG. 5.

To demonstrate this concept, a low power device was constructed in the laboratory producing a two cycle waveform of 100 MHz. The construction employed 50 ohm microstrip waveguide with a strip-width 30 of approximately ½ inch width on ¼ inch plexiglass which is on a metal ground plane 32 as seen in FIG. 5. Two spark gaps 33 and 34 are approximately one foot apart and the output employs a type N connector. The coupling capacitor employed is distributed capacitor 36 with 20 mil thickness teflon 35 for a dielectric between the ½ inch wide stripline. The other capacitor employed is similar to capacitor 36 and is shown as capacitor 37. The output waveform of the device was displayed on a Tektronix Oscilloscope, Model No. 519, with 46 db of attenuation. With a high voltage power supply of approximately 9 kilovolts the output waveform has a peak-to-peak voltage of 2000 volts or 32 kilowatts. This waveform is seen in FIG. 6. It is seen that there are no spurious responses or reflections after the two cycle waveform.

It is noted that in FIG. 1 there is shown charging resistors 21, 22, 23, 24; coupling capacitors 11, 12, 13, and 14, and spark gaps 12 and 13, which are equivalent to charging resistors $R_1$, $R_2$, $R_1'$, $R_2'$; coupling capacitors $C_1$, $C_1'$, and spark gaps 1 and 2, respectively, of FIG. 2.

It is emphasized that FIG. 3 shows a 50 ohm coaxial conductor with outer conductor 26 and inner conductor 27. Charging resistors $R''_1 - R''_6$, coupling capacitors $C''_1 - C''_6$, and spark gaps 1 – 3 are similar to the charging resistors, coupling capacitors, and spark gaps, respectively, of FIG. 1.

What is claimed is:

1. A high peak power short pulse RF generator comprised of a multiplicity of sections of transmission lines of preselected length, said multiplicity of sections being connected in a series arrangement having a first section at one end and a last section and the other end; each of said sections being comprised of in series connection and in the recited sequence, a first transmission line, a coupling capacitor, a second transmission line, and a spark gap; a load connected to the first section of said series arrangement; a third transmission line connected to the last section of said series arrangement; and means to charge each of said sections to a predetermined magnitude to sequentially fire said spark gaps in said sections with said spark gap in said first section firing first.

2. A high peak power short pulse RF generator as described in claim 1 wherein said first and second transmission lines consist of first and second coaxial lines, respectively.

3. A high peak power short pulse RF generator as described in claim 1 wherein said first and second transmission lines is comprised of first and second microstrip waveguides, respectively.

4. A high peak power short pulse RF generator as described in claim 1 further including means to couple an external trigger signal into the first section of said series arrangement.

5. A high power short pulse RF generator as described in claim 2 further including means to couple into the first section of said series arrangement an external trigger signal.

* * * * *